A. LAUKHUFF.
PAPER CUTTING MECHANISM.
APPLICATION FILED JULY 24, 1911.
Reissued Nov. 12, 1912.
13,486.
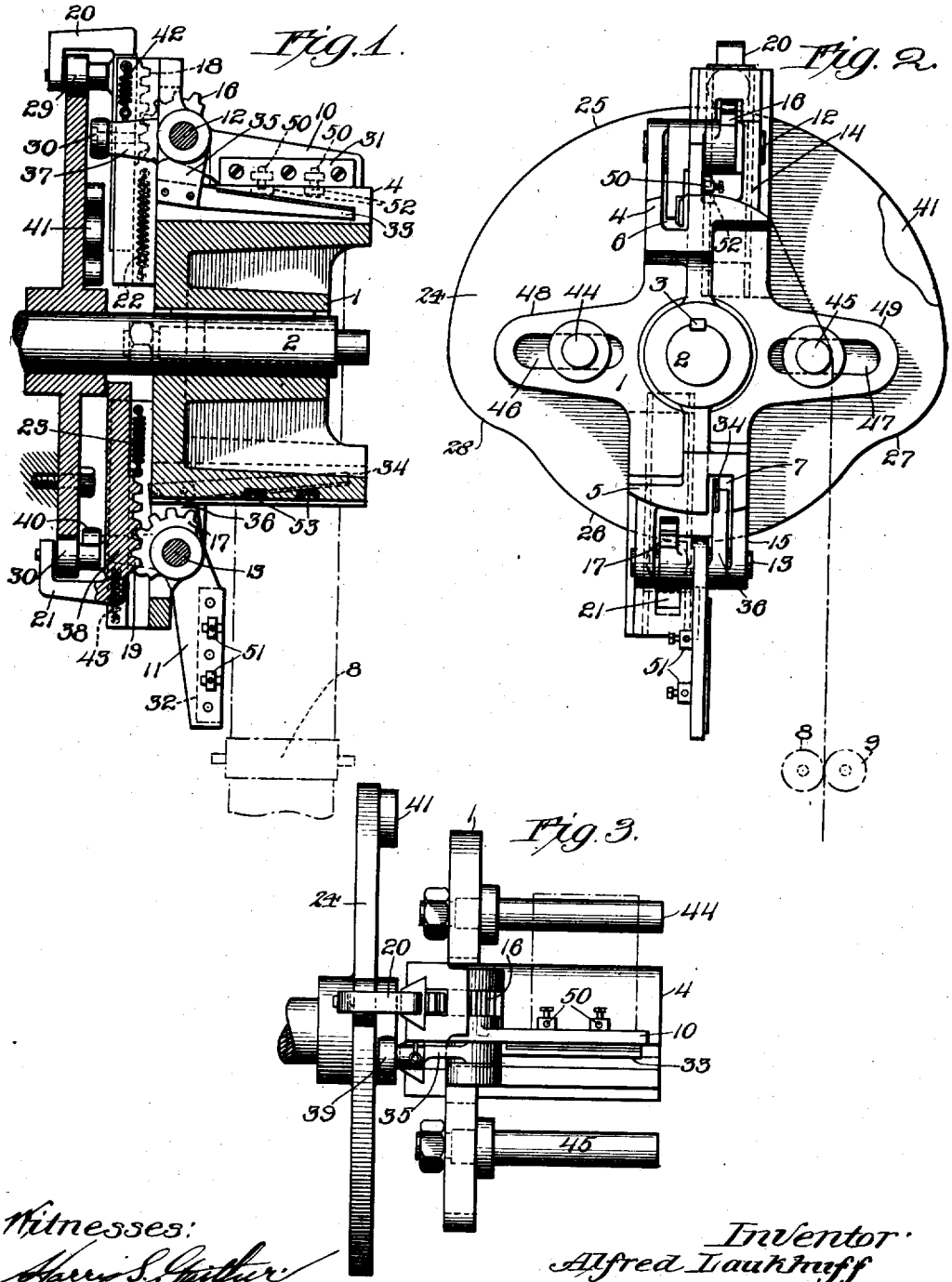
Witnesses:
Harry S. Gaither
Elsie Hagmann
Inventor:
Alfred Laukhuff
by Pierce, Fisher & Clapp
Attys
COLUMBIA PLANOGRAPH CO., WASHINGTON, D. C.

UNITED STATES PATENT OFFICE.

ALFRED LAUKHUFF, OF MILWAUKEE, WISCONSIN.

PAPER-CUTTING MECHANISM.

13,486. Specification of Reissued Letters Patent. Reissued Nov. 12, 1912.

Original application filed October 28, 1908, Serial No. 459,177. Renewed August 23, 1910, Serial No. 578,576. Original No. 988,578, dated April 4, 1911. Application for reissue filed July 24, 1911. Serial No. 640,374.

*To all whom it may concern:*

Be it known that I, ALFRED LAUKHUFF, a subject of the Emperor of Germany, and a resident of Milwaukee, county of Milwaukee, and State of Wisconsin, (formerly of Duisburg, Empire of Germany,) have invented certain new and useful Improvements in Paper-Cutting Mechanism, of which the following is a specification.

My invention relates to mechanisms for cutting paper and similar flexible material; and, while it may be embodied in constructions adapted for various purposes, it is more particularly applicable to cutting webs or continuous lengths of the material into sheets or short lengths, as required in various machines for manipulating paper and like material.

An object of the invention is to provide a mechanism of the character referred to in which shall be combined high speed and great accuracy and precision both as to the sizes of the sheets formed and as to the character of the cutting operations.

Other objects of the invention are to provide a mechanism by which the lengths of the sheets may be easily and accurately regulated; which shall be adapted to cut successive sheets of different lengths; which shall serve simultaneously to advance the web and cut it into sheets; which shall be capable of marking the sheets, if desired; and which mechanism shall be simple, durable and economical in construction, with parts few and compactly and most efficiently arranged, and not apt to get out of order.

These and other objects of the invention will in part be obvious and in part be made clear from the following description.

My invention consists in the novel parts, improvements, combinations, and features of construction herein shown and described.

In the accompanying drawings, which are referred to herein and form a part hereof, is illustrated one embodiment of my invention, the same serving in connection with the description herein to explain the principles of the invention.

Of the drawings: Figure 1 is a vertical central section of a paper cutter constructed in accordance with my invention, parts being shown in perspective; Fig. 2 is a front elevation of the same, looking from the right of Fig. 1; and Fig. 3 is a plan of the same.

A mechanism for cutting sheets from webs, constructed in accordance with one feature of my invention, includes in combination, a rotary web-carrying member, means for supplying a web to said member, web-cutting means mounted on said member, said cutting means including a member movable out of the path of the web to the web-carrying member and a second member movable to perform the cutting operation, and means for operating said cutting members. A mechanism for cutting sheets from webs, constructed in accordance with certain other features of my invention, includes in combination, a rotary web-carrying member, means for supplying a web to said member, a plurality of web-clamping members mounted on said web-carrying member, a plurality of members mounted on said clamping members for cutting the web transversely, means for moving said clamping and cutting members out of the path of the web to the web-carrying member, and means for regulating the lengths of the sheets. According to another feature of my invention, means are provided for marking the sheets. According to certain other features of my invention, said web-carrying member comprises a pair of segmental rotating members; the means for regulating the lengths of the sheets comprises a pair of pins adjustably mounted in frames integrally connected to said segmental web-carrying members; and said marking means comprises die members respectively mounted on the clamping and web-carrying members.

Referring now in detail to the drawings, the embodiment of the invention illustrated comprises a main body portion 1 adapted to receive the paper or other material to be cut. While the paper-receiving or web-carrying member of my machine may be constructed in various ways and be adapted to travel in various paths, preferably and as shown, it is rotatably mounted, being fixed on a shaft 2 by means of a key 3, and includes a number of segmental portions, two being shown and designated by the numerals 4 and 5. These segmental portions are adapted to receive the web and to act as beds on which the web is clamped and thus caused to advance and at the same time be properly presented to the cutting mechanism. In the embodiment of the invention illustrated the said segmental portions have recesses 6 and 7, in which are located cutting members, to which further reference will be hereinafter made.

So far as certain features of my invention are concerned, any suitable means may be provided for clamping the web, supplied to the segmental web-carrying members 4 and 5 by any suitable means, as by rollers 8 and 9. In accordance with one feature of my invention, however, the clamping means comprises clamping members mounted on the web-carrying member. Preferably and as shown, the clamping members consist of a pair of clamping arms 10 and 11. While various provisions may be made for moving the said clamping arms in various directions and ways out of the path of the web to the web-carrying member, see Fig. 2, preferably and as shown, the clamping arms 10 and 11 are mounted on pivot shafts 12 and 13, respectively, said pivot shafts being mounted in bosses 14 and 15, projecting from said main body portion 1, and formed at their rear portions into gear segments 16 and 17, which respectively engage with racks 18 and 19. These racks are formed on or secured to slides 20 and 21, loosely fitting in radial guide slots formed in the main body portion 1. The said slides are constantly drawn toward the shaft 2 by springs 22 and 23, which action of the springs has the effect of moving the clamping arms outwardly away from the segmental web-carrying portions 4 and 5, thereby enabling the arms to pass the web, as shown by the position of the arm 11 in Fig. 1.

While the inward or clamping movement of the arms 10 and 11 may be accomplished in various ways, in the preferred embodiment of the invention illustrated, a stationary cam 24 is provided, the periphery of which, preferably and as shown, is formed with two concentric portions 25 and 26 and with two intermediate portions 27 and 28, which, respectively, have the effect of moving the clamping arms inwardly and outwardly. Upon the periphery of this cam 24 bear antifriction rollers 29, 30 mounted on the respective slide members 20 and 21. It will be apparent that as the segmental web-carrying members 4 and 5 revolve with the shaft 2, carrying with them the said rollers bearing upon the periphery of the said cam 24, the arms 10 and 11 will be held in clamping relation with the said respective segmental web-carrying members 4 and 5, while the rollers 29 and 30 are traversing the high concentric portion 25 of the cam 24; and that, as the said rollers traverse the low concentric portion 26, the slide members 20 and 21 will have been drawn nearer the axis of the shaft 1 by the action of the springs 22 and 23, the arms 10 and 11 having been caused through the operation of the gear members 16, 18, and 17, 19, respectively, successively to assume the position shown by the lever 11 in Fig. 1, as heretofore alluded to, the arms successively moving to said position, while traversing the portion 28 of the cam, and returning to the clamping position while traversing the portion 27.

In accordance with one feature of my invention, means are provided for cutting the sheets from the web as it is advanced by the segmental web-carrying members. While these cutting means may vary in form, number, and location, and in method of operation, preferably, and as shown, two cutting devices are carried by the rotating web-carrying member, one cutting device for each segment of said member. These cutting members, as shown, consist each of relatively movable members or blades, cutting in shear fashion. One member of each cutting device, preferably, is rigidly mounted on the corresponding one of the arms 10 and 11, said cutting blades being numbered 31 and 32, respectively. The other members, 33, and 34, preferably and as shown, are mounted on or formed by the inner arms of bell-crank levers 35 and 36, which are preferably mounted on the pivot shafts 12 and 13 and whose outer arms 37 and 38 carry antifriction rollers 39 and 40, which during their travel with the rotating segmental web-carrying portions 4 and 5 bear upon the inclined surface of a secondary cam 41, suitably located on the face of the cam 24. As will be apparent, when the rollers 39, 40 are successively brought into bearing relation with the said inclined surface of the cam 41, the bell-crank levers to which they are attached are successively actuated so that the cutting members 33 and 34 are brought into cutting relation with the cutting members 31 and 32, being successively restored to their inactive positions in the recesses 6 and 7, heretofore mentioned, after the respective rollers 39 and 40 have passed the cam 41, by the pull of the springs 42 and 43, respectively, attached to the body portion 1 and to the outer arms 37 and 38 of said bell-crank levers.

In accordance with certain features of my invention, means are provided for regulating the lengths of the sheets to be cut. While various means may be provided for this purpose, in the preferred embodiment of the invention illustrated pins 44 and 45 are provided, the same being respectively fastened in slots 46 and 47 in the frame portions 48 and 49 of the main body portion 1, said frame portions, preferably and as shown, being at right angles to the segmental web-carrying members 4 and 5 and extending outwardly any desired distance.

It will be apparent that, as these pins 44 and 45 are set in said slots, whether near or farther from the axis 1 of the shaft 2, so will the length of the sheet to be cut vary. It will also be apparent that said pins may be set at different distances, respectively, from said axis, with the result that the successive sheets will be cut of different lengths. It will be obvious that by varying the number of segments and cutters with the intermediate pins any desired number of different lengths of sheets may be cut. And it will be further noted that by removing or rendering inoperative one or all but one of the cutting devices the length of the sheets may be still further varied.

It is often desirable to mark the paper while in the process of cutting. To this end, my invention contemplates the employment of marking mechanism, which is combined and coöperates with the clamping and cutting means. In the embodiment illustrated the marking means consist of the die members 50 and 51, preferably mounted on the clamping arms 10 and 11, respectively, and which die members emboss or otherwise mark the web at the same time that the cutting process is performed, suitable coöperating die members 52 and 53 being provided, when desired, in the segments 4 and 5, see Fig. 1.

While the operation of the apparatus will be clearly apparent from the foregoing description, it may be here observed that said apparatus is adapted to form part of or be used in connection with other machines for various purposes, as bag and envelop making machines.

It will be seen that by reason of the fact that the cutting mechanism travels with the web during the cutting operation, ample time is given to effect the cutting operation, this being conducive to both speed and accuracy; moreover, the character of cutting mechanism, which is thus permitted to be employed, insures a clean, accurate cut of the material at the precise point or points desired. It will be observed also that the web is firmly clamped at points adjacent to the cutting mechanism, and that the cutting operation is effected while the paper is held taut and controlled at both sides of the cutting points. That is to say, the high portion of the cam 24 is longer than the low portion thereof, so that one of the clamp arms or members comes into operation to engage the web before the web is released by the other clamp arm. In this way the mechanism serves to advance the web as it is cut into lengths and the web is held taut between the clamps and on both sides of the cutting point during the operation of the cutters. Other advantages will be apparent to those skilled in the art.

My invention in its broader aspects is not limited to the precise construction shown and described, nor to any particular construction by which the same has been or may be carried into effect, as many changes may be made in the details thereof without departing from the main principles of the invention and without sacrificing its chief advantages.

I claim:

1. A mechanism for cutting sheets from webs including in combination, a rotary web-carrying member, means for supplying a web to said member, web-cutting means mounted on said member, said cutting means including a member movable out of the path of the web to the web-carrying member and a second member movable to perform the cutting operation, and means for operating said cutting members.

2. A mechanism for cutting sheets from webs including in combination, a rotary web-carrying member, means for supplying a web to said member, web-cutting means mounted on said member, said cutting means including a member movable out of the path of the web to the web-carrying member and a second member movable to perform the cutting operation, means for operating said cutting members, and means for regulating the length of the sheets.

3. A mechanism for cutting sheets from webs including in combination, a rotary web-carrying member, means for supplying a web to said member, a plurality of web-cutting means mounted on said member, each of said cutting means including a member movable out of the path of the web to the web-carrying member and a second member movable to perform the cutting operation, and means for operating said cutting members.

4. A mechanism for cutting sheets from webs including in combination, a rotary web-carrying member, means for supplying a web to said member, web-cutting means mounted on said member, said cutting means including a member movable out of the path of the web to the web-carrying member and a second member movable to perform the cutting operation, and fixed cams for operating the respective cutting members.

5. A mechanism for cutting sheets from webs including in combination, a rotary web-carrying member, means for supplying a web to said member, a plurality of web-cutting means mounted on said member, each of said cutting means including a member movable out of the path of the web to the web-carrying member and a second member movable to perform the cutting operation, means for operating said cutting members, and means for independently regulating the lengths of the successive sheets.

6. A mechanism for cutting sheets from webs including in combination, a rotary web-carrying member, means for supplying a web to said member, web-clamping means mounted on said member, said clamping means including a member for cutting the web transversely, and a member for clamping the web between the cutting member and the web-supplying means, and means for moving said clamping means and cutting member out of the path of the web to the web-carrying member.

7. A mechanism for cutting sheets from webs including in combination, a rotary web-carrying member, means for supplying a web to said member, a plurality of web-clamping members mounted on said web-carrying member, a plurality of members mounted on said clamping members for cutting the web transversely, said web-clamping members acting on the web between the cutting members and the web-supplying means, and means for moving said clamping and cutting members out of the path of the web to the web-carrying member.

8. A mechanism for cutting sheets from webs including in combination, a rotary web-carrying member, means for supplying a web to said member, a plurality of web-clamping members mounted on said web-carrying member, a plurality of members mounted on said clamping members for cutting the web transversely, said web-clamping members acting on the web between the cutting members and the web-supplying means, and a fixed cam for moving said clamping and cutting members out of the path of the web to the web-carrying member.

9. A mechanism for cutting sheets from webs including in combination, a rotary web-carrying member, means for supplying a web to said member, web-clamping means mounted on said member, means for cutting the web, said cutting means including a member mounted on said clamping means and a second member located within said web-carrying member, means for moving said clamping means out of the path of the web to the web-carrying member, and means for moving said second cutting member to perform the cutting operation.

10. A mechanism for cutting sheets from webs including in combination, a rotary web-carrying member, means for supplying a web to said member, a plurality of web-clamping means mounted on said member, a plurality of means for cutting the web, each of said cutting means including a member mounted on one of said clamping means and a second member located within said web-carrying member, means for moving said clamping means out of the path of the web to the web-carrying member, and means for moving the respective second cutting members to perform the cutting operation.

11. A mechanism for cutting sheets from webs including in combination, a rotary web-carrying member, means for supplying a web to said member, web-clamping means mounted on said member, said clamping means including a member for cutting the web transversely, means for moving said clamping means and cutting member out of the path of the web to the web-carrying member, and means for regulating the length of the sheets.

12. A mechanism for cutting sheets from webs including in combination, a rotary web-carrying member, means for supplying a web to said member, web-clamping means mounted on said member, said clamping means including a member for cutting the web transversely, means for moving said clamping means and cutting member out of the path of the web to the web-carrying member, and means for independently regulating the lengths of the successive sheets.

13. A mechansim for cutting sheets from webs including in combination, a rotary web-carrying member, means for supplying a web to said member, a plurality of web-clamping members mounted on said web-carrying member, a plurality of members mounted on said clamping members for cutting the web transversely, means for moving said clamping and cutting members out of the path of the web to the web-carrying member, and means for independently regulating the lengths of the successive sheets.

14. A mechanism for cutting sheets from webs including in combination, a rotary web-carrying member, means for supplying a web to said member, web-clamping means mounted on said member, means for cutting the web, said cutting means including a member mounted on said clamping means and a second member located within said web-carrying member, a fixed cam for moving said clamping means out of the path of the web to the web-carrying member, and a secondary cam fixed on said first cam for moving said cutting member to perform the cutting operation.

15. A mechanism for cutting sheets from webs including in combination, a rotary web-carrying member, means for supplying a web to said member, web-clamping means mounted on said member, said clamping means including a member for cutting the web transversely, and a member for clamping the web between the cutting member and the web-supplying means, means for moving said clamping means and cutting member out of the path of the web to the web-carrying member, and means located on said clamping means for marking the sheets.

16. A mechanism for cutting sheets from webs including in combination, a rotary web-carrying member, means for supplying a web to said member, web-clamping means mounted on said member, said clamping means including a member for cutting the web transversely, and a member for clamping the web between the cutting member and the web-supplying means, means for moving said clamping means and cutting member out of the path of the web to the web-carrying member, and means located on said clamping and web-carrying means for marking the sheets.

17. A mechanism for cutting sheets from webs including in combination, a rotary segmental web-carrying member, means for supplying a web to said member, web-clamping means mounted on said member and comprising an arm having a gear segment coöperating with a spring-controlled rack connected to a roller, said clamping means including a member for cutting the web transversely, and a fixed cam upon which said roller rotates, whereby said clamping means and cutting member are moved out of the path of the web to the web-carrying member.

18. A mechanism for cutting sheets from webs including in combination, a rotary segmental web-carrying member, means for supplying a web to said member, web-clamping means mounted on said member and comprising a pivoted clamping arm, a gear segment on said arm, a spring-controlled rack meshing with said segment, means for cutting the web, said cutting means including a member mounted on said clamping means and a second member located within said web-carrying member and mounted on a lever on which said second member is mounted, a fixed cam for operating said rack whereby said clamping means and said first-named cutting member are moved out of the path of the web to the web-carrying member, a second cam fixed on the face of said first cam to operate said lever whereby said second cutting member is moved to perform the cutting operation, and a plurality of pins adjustably secured in said web-carrying member for regulating the length of the sheets.

19. A mechanism for cutting sheets from webs including in combination, a rotary web-carrying member, a cutter member and a clamp member both mounted on said web-carrying member, and independent operating means for said cutter and clamp members.

20. In mechanism for cutting sheets from webs including in combination, a rotary web-carrying member, means for supplying a web to said member, a cutter member and a clamp member both mounted on said web-carrying member and means for moving said cutter and clamp members out of the path of the web to the web-carrying member, and for effecting the independent operation thereof to perform their respective functions.

21. In a cutting mechanism, the combination of a rotary web-carrier, means for supplying a web to said carrier, cutters and a coöperating clamp mounted on said carrier, and means for moving said clamp and one of said cutters out of the path of the web to said carrier and for independently operating said clamp and said cutters to successively clamp and cut the web.

22. In a cutting mechanism the combination of a rotary web-carrier for supplying a web to said carrier in a direction transverse to the axis of rotation thereof, cutters and a coöperating clamp mounted on said carrier, said cutters operating in a plane substantially parallel to the axis of said member to sever the web transversely and means for moving said clamp and one of said cutters out of the path of the web to said carrier and for independently actuating said clamp and said cutters to successively effect the clamping and cutting operations.

23. In a cutting mechanism the combination of a rotary web-carrier, means for supplying a web thereto in a direction transverse to the axis of rotation of said carrier, a plurality of pairs of cutters and coöperating clamps mounted on said carrier, said cutters operating in planes substantially parallel to the axis of said carrier, and means for moving said clamps and one of each pair of cutters out of the path of the web and for independently actuating said clamps and said cutters to successively perform the clamping and cutting operations.

24. In a cutting mechanism, the combination of a rotary web-carrier, means for supplying a web to said carrier in a direction transverse to the axis of rotation thereof, a plurality of clamps and coöperating cutters mounted on said carrier, and means for shifting said clamps to successively engage and release said web to advance the same and for effecting the independent operation of said cutters to sever the web.

25. A mechanism for cutting sheets from webs including in combination a rotary web-carrying member, means for supplying a web to said member, a web-clamping member and a coöperating cutting member mounted on said web-carrying member, said web-clamping member being arranged between said cutter and said web-supplying means, and means for moving said clamping and cutting members out of the path of the web to the web-carrying member.

26. In cutting mechanism, the combination of a rotary web-carrier, means for supplying a web to said carrier in a direction transverse to the axis of rotation thereof, a plurality of pairs of cutters for severing the web transversely, and coöperating clamps mounted on said carrier, said clamps being arranged on the feed side of said pairs of cutters and means for operating said clamps and cutters to successively grip and sever the web.

27. A mechanism for cutting sheets from webs including in combination, a rotary web-carrying member, means for supplying a web to said member, web-cutting means mounted on said member, said cutting means including coöperating members, one of which is movable out of the path of the web to the web-carrying member, means for operating said cutting members and means independent of said cutting means and adjustably mounted on said web-carrying member for regulating the length of the sheets.

28. In cutting mechanism, the combination with a rotary web-carrier, means for supplying a web to said carrier in a direction transverse to its axis, a plurality of clamps and coöperating cutters mounted on said carrier, means for shifting said clamps to successively engage and release the web to advance the same and for operating said cutters to sever the web, and web engaging devices separate from said cutters adjustably mounted on said carrier for varying the lengths cut from the web.

29. In a cutting mechanism, the combination of a rotary web-carrier, means for supplying a web to said carrier in a direction transverse to the axis of rotation thereof, a plurality of clamps and coöperating cutters mounted on said carrier, means for shifting said clamps and one of said cutters out of the path of the web and for successively operating said clamps and cutters to advance the web and sever the same, and pins on said carrier and between said clamps over which the web passes, said pins being adjustable to and from the axis of said web-carrier to vary the lengths cut from the web.

30. In a cutting mechanism, the combination of a rotary web-carrier, means for supplying a web thereto, a plurality of sets of coöperating cutters and clamps mounted on said carrier, means for operating said cutters and clamps, and web engaging devices mounted on said carrier between said sets of cutters and clamps, said devices being adjustable to vary the lengths cut from the web.

31. In a cutting mechanism, the combination of a rotary web-carrier, means for supplying a web thereto, a plurality of sets of coöperating cutters and clamps mounted on said carrier, means for moving said clamps and cutters out of the path of the web to the carrier and for operating the same and pins adjustably mounted on said carrier between said sets of cutters and clamps and arranged to engage the web to vary the lengths severed therefrom.

32. In a cutting mechanism, the combination of a rotary web-carrier, means for supplying a web to said carrier in a direction transverse to the axis thereof, two sets of coöperating clamps and cutters mounted on said carrier, said clamps being arranged on the feed side of said cutters and means for moving said clamps and cutters out of the path of the web and for successively operating the same, said means being arranged to hold both of said clamps in engagement with said web during the operation of said cutters and said cutters being arranged to sever the web transversely between said clamps.

33. In a cutting mechanism, the combination of a rotary web-carrier, means for supplying a web to said carrier in a direction transverse to the axis thereof, two sets of coöperating clamps and cutters mounted on said carrier, said clamps being arranged on the feed side of said cutters, means for moving said clamps and cutters out of the path of the web and for successively operating the same, said means being arranged to hold both of said clamps in engagement with the web during the operation of said cutters and said cutters being arranged to sever the web transversely between said clamps, and means on said carrier for adjusting the lengths of the web held between said clamps.

ALFRED LAUKHUFF.

Witnesses:
ELEANOR HAGENOW,
KATHARINE GERLACH.

Copies of this patent may be obtained for five cents each, by addressing the "Commissioner of Patents, Washington, D. C."